June 11, 1968 B. D. COFFIN, JR., ET AL 3,388,380

SYSTEM FOR DISPLAY OF A WORD DESCRIPTION OF PARAMETERS AND VALUES THEREOF IN RESPONSE TO AN INPUT OF A WORD DESCRIPTION OF THE PARAMETER

Filed June 17, 1965 2 Sheets-Sheet 1

INVENTORS
BERTRAM D. COFFIN JR.
JOHN V. WERME

BY Harold C. Meier
ATTORNEY

INVENTORS
BERTRAM D. COFFIN JR.
JOHN V. WERME
BY Harold C. Meier
ATTORNEY

United States Patent Office 3,388,380

Patented June 11, 1968

3,388,380

SYSTEM FOR DISPLAY OF A WORD DESCRIPTION OF PARAMETERS AND VALUES THEREOF IN RESPONSE TO AN INPUT OF A WORD DESCRIPTION OF THE PARAMETER

Bertram D. Coffin, Jr., Mentor, and John V. Werme, Painesville, Ohio, assignors to Bailey Meter Company, a corporation of Delaware Filed June 17, 1965, Ser. No. 464,796
7 Claims. (Cl. 340—147)

ABSTRACT OF THE DISCLOSURE

A data display system including a panel of pushbuttons representing numerous measured parameters. A selection of pushbuttons representing a particular parameter generates a code which identifies the parameter selected. The system responds to this code by simultaneously reading from two independent sections of a magnetic drum, a word description of the parameter and the instantaneous numerical value of the selected parameter. The word description of the selected parameter and the numerical value of this parameter are visually displayed for viewing by a system operator.

This invention relates to an improvement in man-machine communication. More specifically, this invention relates to a system for displaying the value of a variable and identifying it by a three word phrase.

In this age of automation, sometimes referred to as a second industrial revolution, one problem continuously facing the human operator is how to communicate with a changing process. One particular phase of this man-machine communication problem is that of interpreting the performance of the process. The human operator must be able to quickly and positively determine the performance of a process's assigned task.

Where the performance is determined by many different variables the job of communication becomes monumental. For example, take the case of a computer controlled steam turbine-generator. Many variables must be measured both at the boiler and the turbine-generator to determine if the computer is controlling to the desired rate in the most efficient manner. An operator must be able to quickly and accurately read the value of any one of possibly 1,000 variables.

Heretofore, the methods used in automatically logging data have been able to accurately determine the value of a variable but have not been able to identify it in a manner readily grasped by an operator. There is also the problem of the operator quickly and accurately telling the machine which variable is to be displayed. Many earlier methods used telephone type dial switches for variable selection. Each variable was assigned a number and when a particular variable was to be exhibited its number would be dialed. This meant either the operator had to memorize the numbers associated with each variable or refer to an index. Too often the index reference was a long bothersome procedure and the operator would rely on memory. Needless to say, it is very difficult for anyone to memorize a particular number assigned to each of 1,000 variables. Even if the right reference number was selected there was still the chance of a dialing error. These earlier methods displayed the value of the variable but left it unidentified.

A variation of the telephone type dial switch was a series of thumb-wheel switches. This is subject to the same shortcomings, it still relies on the operator correctly setting the thumb-wheel position. Since the thumb-wheel switch remains in a set position it could be checked to be sure the selected number was dialed but the displayed variable is left unidentified.

One of the objects of our invention is to provide a data presentation system where the magnitude of a variable and a three word identification of the variable are presented simultaneously.

Another object of our invention is to provide a data presentation system wherein a magnetic drum has stored therein preselected codes related to the particular variables being monitored.

Other objects and advantages of our invention will be particularly pointed out in the accompanying description and identified in the appended claims.

Referring to the drawings.

Figure 1:
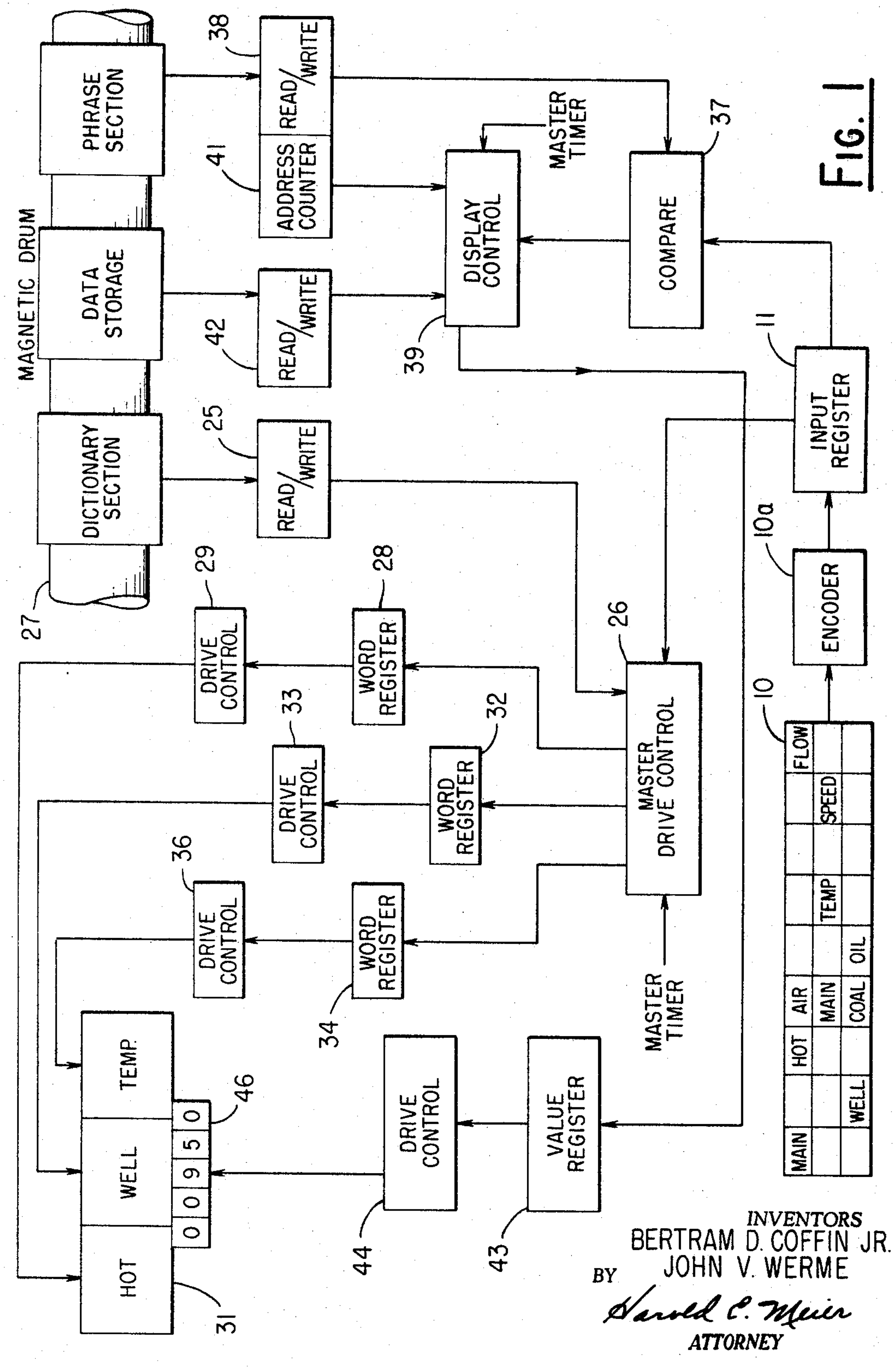
FIG. 1 is a block diagram of a data presentation system.

Our display system is usually part of a sophisticated, stored program, computing, digital information system that includes the functions of logging, scanning, alarming, computing and display. The main memory is a magnetic drum rotating at 1800 r.p.m. and having 100 words per track; the standard word length being 25 bits. The magnetic drum is divided into several sections, each an independent operating unit, with one set of sync tracks used to synchronize all sections. Parts of the magnetic drum use a technique known as "sector gearing" to reduce the complexity of addressing and to reduce the amount of equipment. Sector gearing refers to the technique of storing related pieces of information at preselected identical positions in different drum sections. For example, one section, which will be described in more detail later, is called the data storage section and contains the current value of all inputs and current values of many computed numbers. Another section contains high alarm limits which are stored at identical locations as the current value of the variable to which it is related, each in their own respective sections. Thus, each alarm limit is "sector geared" to the current value of the variable to which it is related. The magnetic drum also contains a dictionary section and a phrase section, the phrase return is sector geared to the data storage section.

The key to the operation of our system is the word format in the dictionary section of the magnetic drum and the pushbutton selection of such words. Each dictionary word is divided into 4, six bit characters plus a sign bit, which is not used. Each group of four characters is a name which is part of a legend, for example, TEMP, MAIN, HOT, OPEN, NO–7, WELL, etc. For pushbutton selection of a three word phrase from the dictionary, a similar 25 bit code is divided into three groups of eight bits plus a sign bit (not used). Each 8 bit group is divided into 2 subgroups of 4 bits which represent a binary-coded decimal number ranging from 0 to 9, each pair of binary-coded decimal numbers is the address of a 25 bit word in the dictionary. With a 100 word dictionary the address numbers range from 00 to 99.

Referring to FIG. 1, we show an array of twenty-seven pushbuttons 10, one for each 25 bit word stored in the dictionary section and used to make up the phrases of the variables to be identified. For purposes of this description we have assumed a dictionary of 100 words: only 27 of the 100 pushbuttons required have been shown as it is not believed necessary to show more in order to understand our invention. The number of dictionary words is not significant but would be controlled by the number and type of phrases used to identify the variables to be displayed. To display the variable identified by the phrase HOT WELL TEMP the buttons marked HOT, WELL and TEMP are actuated. Pushing the button marked HOT closes a single pole switch thereby completing a circuit to an encoder 10*a*, the address of the word HOT would in turn be stored in the input register 11 in binary-coded decimal form. Pushing the buttons marked WELL and TEMP similarly close single pole switches thereby storing the respective addresses in the input register 11.

Figure 2:
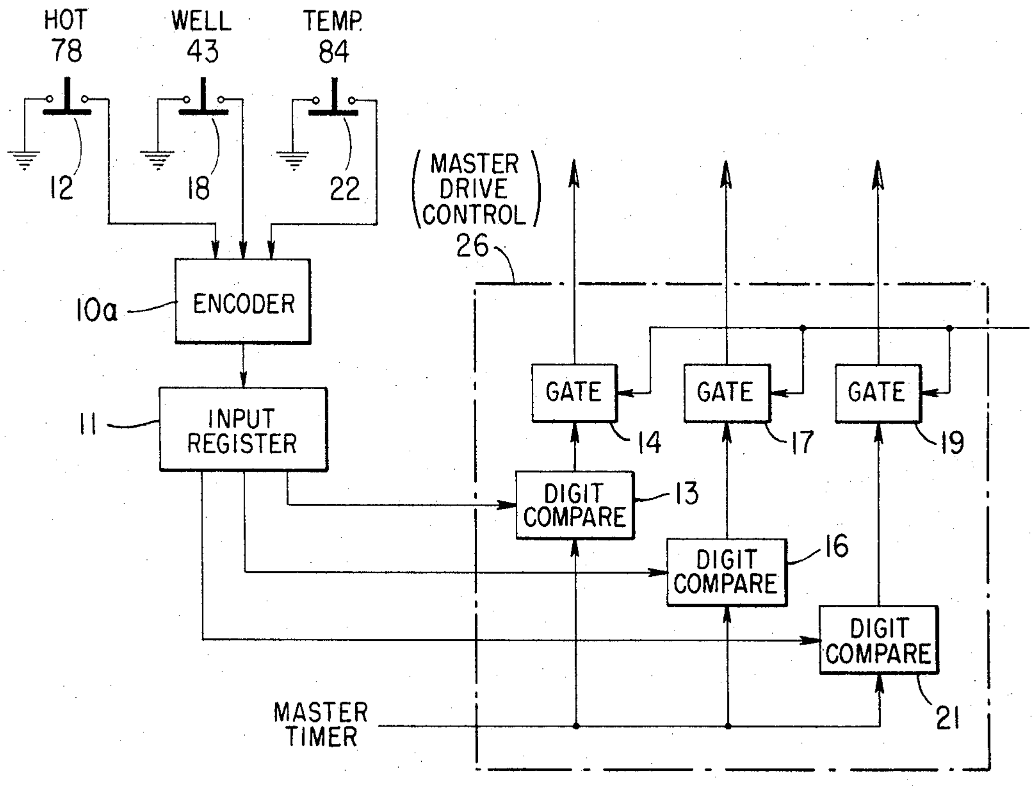
FIG. 2 is a schematic diagram of the pushbutton selection, input register, and the drive control.

Referring to FIG. 2, we show the single pole switches representing the pushbuttons associated with the words HOT, WELL and TEMP. For descriptive purposes, we have assigned the word HOT, address 78; the word WELL, address 43; and the word TEMP, address 84. Closing the switch 12, representing the word HOT, completes a circuit to an encoder 10a which generates a code for storage in the input register 11. Closing switch 18, representing WELL, and switch 22, representing TEMP, likewise completes a circuit to the encoder 10*a* which generates appropriate codes for storage in the input register 11. The encoder 10*a* consists of two diode matrixes, one for each of the two digits in the word address of the data section of the magnetic drum. A diode matrix, which is a pre-arranged inter-connection of diodes, converts a single channel decimal number into an eight channel binary decimal code. The input register 11 is essentially a temporary storage means for the binary-coded decimal numbers generated by closing the switches 12, 18, and 21. Basically a register is nothing more than a series of flip-flop circuits having two stable states, one state identified with a logic ZERO and the other with a logic ONE. To accommodate the 25 bit code required to identify the three words HOT, WELL and TEMP the input register 11 has a storage capability of 25 pieces of information. In other words, the input register 11 would be equipped with 25 flip-flop circuits. A reset circuit is also provided to reset the entire 25 bit code to logic ZERO when desired.

With the completion of the entry of the address of a three word phrase into the input register 11 two operations would begin. The first operation establishes the identity of a selected parameter by word description, whereas the second operation generates a numerical display which represents the instantaneous numerical value of the selected parameter. The first operation consists of shifting the 25 bit code representing the three word identifying phrase into a drive control unit 26 which transfers the individual word codes from the dictionary section of a magnetic drum 27 to a word indicator 31 through a read/write amplifier 25. The read/write amplifier 25 and the other read/write amplifiers of our system are basic computer hardware. The write section of the amplifier generates heavy current pulses to magnetize the drum's surface a bit at a time. It is a power amplifier which accepts a pulse train of data at its input and generates current pulses which causes word bits to be written on the drum. The read section of the amplifier is a high gain voltage device whose job is to accept the low level read-back signals from the drum and to amplify and shape them into the proper pulse train. In a read/write amplifier the reading and writing operations never occur simultaneously, only one or the other can be performed at any instant of time. Although somewhat brief, this description of read/write amplifiers should suffice to clarify the meaning of the terms read and write; read meaning to use the stored information and write meaning to store information.

The drive control unit 26 receives the continuous stream of pulses from the read/write amplifier 25 as the magnetic drum 27 revolves. Again referring to FIG. 2, the drive control 26 consists of three identical circuits for transferring the word codes to the appropriate section of the word indicator 31. The first word entered into the input register 11, after closing a pushbutton 10, would be stored at the far right position of the register. An 8 bit code representing the address of the first identifying word would be connected to one input of a digit compare unit 13. Also connected to the digit compare unit 13 would be a timing code from a master synchronizing timer, this code represents the position of the magnetic drum 27 at any particular instant in time. The digit compare unit 13 produces an output signal when the word address in the input register 11 coincides with the drum position signal from the master synchronizing timer. In other words, when the particular word selected by actuating a pushbutton 10 is about to be read from the magnetic drum 27 the digit compare unit 13 generates a logic output signal. This output signal is introduced to a gate unit 14, interposed between the read/write amplifier 25 and a word register 28, as shown in FIG. 1.

The address of the second word selected to identify a variable would also be represented by a code of eight information bits in the input register 11, this code would be connected to a digit compare unit 16. Also connected to the digit compare unit 16 would be drum position pulses from the master synchronizing timer. As in the case of the first identifying word, when coincidence occurs bebetween the 8 bit code representing the address of the second word and the position code from the master synchronizing timer the compare unit 16 generates a logic output signal that opens a gate unit 17. The second identifying word would be transferred from the read/write amplifier 25 through the gate unit 17 to a word register 32, as shown in FIG. 1. In an identical manner, the third identifying word would be transferred from the magnetic drum 27 to a word register 34 when a gate unit 19 was opened by the output signal from a digit compare unit 21. The digit compare unit 21 would produce the necessary gate opening signal when coincidence occurs between an 8 bit code from the input register 11 and the drum position signal from the master synchronizing timer. The 8 bit code from the input register 11 would represent the dictionary address of the third identifying word.

The gate units 14, 17 and 19 are simple AND circuits that produce a logic ONE output signal when the two input signals are logic ONE. As such, the AND circuit is often referred to as a conditional switch which has an output and a number of inputs. If one of the inputs to an AND circuit consists of information bits of logic ONE and logic ZERO the output will also be information bits of logic ONE and logic ZERO if the second input is logic ONE. Thus, the gates 14, 17 and 19 are transfer elements that transfer the word codes from the dictionary section of the magnetic drum 27 to the appropriate word register.

With the completion of a transfer of the third identifying word from the magnetic drum 27, all three words are stored in their respective word registers. The word HOT being stored in the word register 28, the word WELL in the word register 32, and the word TEMP in the word register 34. These registers are similar to the input register 11 and as such are temporary storage means for the information transferred from the magnetic drum 27. To display the word HOT in the word indicator 31 a drive control 29 is connected to the word register 28. The drive control responds to the stored bits of information in the word register 28 and generates the necessary power signals to illuminate the letters H, O, T in the first position of the word indicator 31. Similarly, a drive control 33 receives the information bits from the word register 32 and generates the necessary power signals to illuminate the letters W, E, L, L in the second position of the word indicator 31. Finally, a drive control 36 responds to the information signals stored in the word register 34 to generate the power signal required to illuminate the letters T, E, M, P in the end position of the word indicator 31. The drive control units are basically a plurality of parallel operated gated switches used to switch current on or off to the various letters in the word indicator 31.

The second operation to begin, after a 25 bit code representing the address of a three word identifying phrase has been entered into the input register 11, consists of transferring the instantaneous value of a selected variable from the data storage section of the magnetic drum 27. A read/write amplifier 38 transfers 25 bit codes representing three word phrases from the phrase section of the magnetic drum 27 to a digit compare unit 37. Each of these codes represent a variable stored in the data section of the drum. The digit compare unit 37 performs a function which is similar to that performed by the digit compare units 13, 16 and 21 of FIG. 2. The digit compare unit 37 produces a logic output signal when the 25 bit code in the input register 11 coincides with a 25 bit code transferred from the phrase section of the magnetic drum 27. This logic output signal is connected to a display control unit 39 interposed between an address counter 41 and a read/write amplifier 42.

Figure 3:
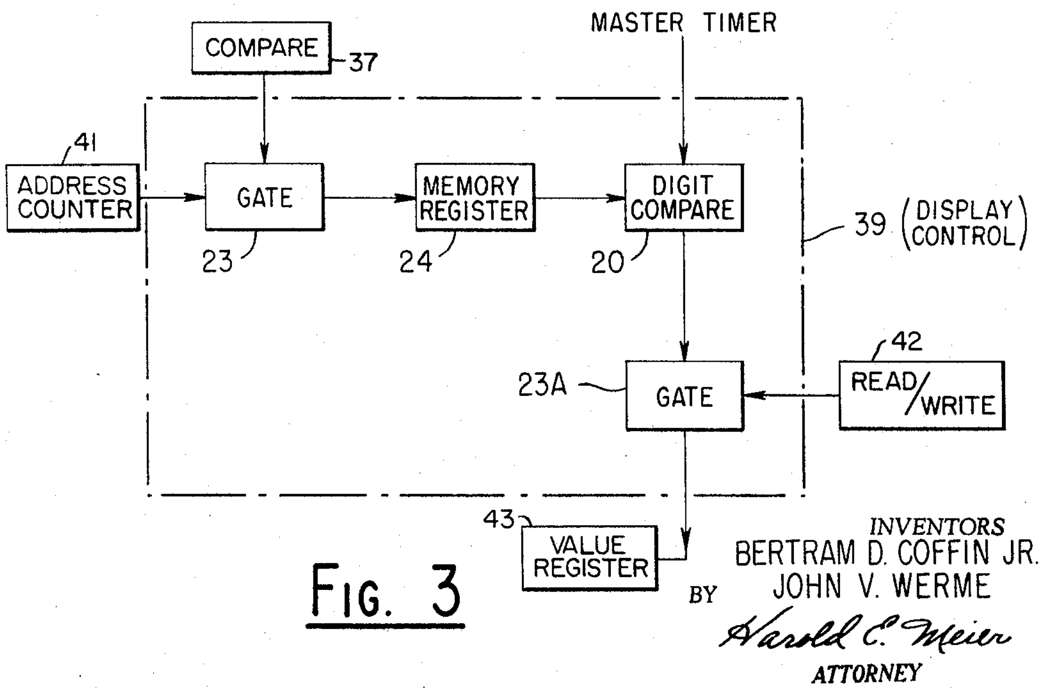
FIG. 3 is a schematic diagram of the display control.

Referring to FIG. 3, I show in detail the display control unit 39. The logic ONE signal generated by the digit compare unit 37 would be one input to a gate unit 23, the second input being information from the address counter 41. The information from the address counter 41 represents the address where coincidence occurred in the digit compare unit 37; through sector gearing this information also represents the address of the variable reading in the data storage section of the magnetic drum 27. Gate unit 23 is similar to gate unit 14 and as such produces an output code equal to that transmitted by the address counter 41 if the output of the digit compare unit 37 is logic ONE. The input of the gate unit 23 is shifted into a memory register 24 the purpose of which is to store the address of the variable to be read from the data section of the magnetic drum 27 on its next revolution. The memory register 24 is similar to the input register 11 and likewise functions as a temporary storage device. The information bits stored in the memory register 24 are made available to a digit compare unit 20 having as a second input the drum position signals from the master synchronizing timer. When coincidence occurs between the address stored in the memory register 24 and the position signal from the master timer the digit compare unit 20 produces a logic output signal. It should be noted that this coincidence occurs one revolution after the address is stored in the memory register 24. The operation of the digit compare unit 20 is similar to the operation of the digit compare units of the word control 26. Its logic ONE output signal is connected to a gate unit 23A. Also connected to the gate unit 23A is an information code representing the value of the variable selected for display as transmitted by a read/write amplifier 42. The output of the gate unit 23A will be equal to the information bits from the data section of the magnetic drum 27 as transferred by the read/write amplifier 42.

Thus, at one drum revolution after coincidence occurs in the digit compare unit 37 a code representing the current value of the variable selected for display is transferred to a data register 43. Data register 43, like word registers 28, 32 and 34, is a temporary storage device consisting of a series of flip-flop circuits, one for each pulse in the variable data. Connected to the data register 43 is a drive unit 44 made up of a plurality of gated switches and functioning to produce a series of power signals to illuminate the appropriate numbers in the numerical display 46.

Assume now the operator desires to read the variable identified by the phrase MAIN OIL FLOW, but instead of pushing the button marked OIL, he accidently pushes the button marked COAL. The word display part of the system would operate as previously described. The 8 bit code representing the address of the word COAL would be entered into the input register 11 instead of the address code representing the word OIL. The read/write amplifier 25 would transfer the 25 bit code stored at the address of the word COAL through the gate unit 17 to the word register 32. Displayed in the second section of the word indicator 31 would be the word COAL. The three word phrase now appearing in the display indicator 31 would read MAIN COAL FLOW. This in itself should be sufficient to put the operator on notice that he has made a mistake in selection which he can very easily correct by pushing the proper button sequence. If he does not notice the mistake, or possibly he has pushed the buttons he desired thinking there is a variable identified by the phrase, MAIN COAL FLOW, our system will not display an incorrect reading.

Although the word display section operates as usual, the numerical display will detect the error and not display a reading. Again the digit compare unit 37 compares the 25 bit code in the input register 11 with those scanned by the read/write amplifier 38 as stored in the phrase section of the magnetic drum 27. When an incorrect code has been entered into the input register 11, that is, one which does not exist in the phrase section of the magnetic drum, coincidence will not occur in the digit compare unit 37. Consequently a logic ONE input signal will not be connected to the gate unit 23A and will thus block any information from being transferred to the value register 43. As a result a numerical display 46 will remain dark and not display a reading. This unique feature of our invention prevents an erroneous reading from being associated with a selected variable.

As is apparent from our description, we have chosen not to burden our specification with details of circuitry which are standard in digital computer work. We have not shown nor described the equipment and circuitry required to store and update the variable data stored in the magnetic drum 27. If a variable was being displayed during an updating cycle of the stored variable the new value would immediately be displayed in the numerical display 46. It is to be understood that the embodiment shown and described herein is for purposes of an example and is not intended to limit the scope of the appended claims.

What we claim as new and desire to secure by Letters Patent of the United States is:

1. Apparatus for display of a variable, comprising:
word selection means for selecting the variable to be displayed;
means connected to said word selection means for generating a code representing the word description of the variable to be displayed;
storage means for storing in code form a dictionary of words available in said word selection means;
a first means for withdrawing from said storage means words represented by the generated code;
word display means connected to said withdrawal means and actuated by the word code from said storage means to identify by word description the variable selected for display;
a second storage means for storing in code form the preselected phrases representing the variables chosen for display;
a third storage means for storing in code form the latest readings of the variables chosen for display;
means for comparing the generated code with those stored in said second storage means;
a second means for withdrawing the coded value of the variable from said third storage means;
means for synchronizing the withdrawal of said coded value of the variable in time relationship with the detection of coincidence between the code of a stored phrase and said code generated by said comparing means; and
numerical display means connected to said second withdrawal means for presenting a numerical display of the value of the variable withdrawn from said third storage means and displayed in said word display means.

2. Apparatus for display of a variable, comprising:
word selection means for selecting the variable to be displayed;
a register connected to said word selection means for temporary storage of a code representing said selected words;
a magnetic drum having a dictionary word section for storing in code form a dictionary of words available in said word selection means, a current data section for storing in code form the latest readings of the variables chosen for display and a phrase section for storing in code form phrases selected to represent the variables chosen;

means for reading the coded words from the dictionary section of said magnetic drum;

means connected to said reading means and said register for selecting the word codes from said dictionary as represented by the code in said register;

word display means connected to said last name means and actuated by the word codes from said magnetic drum to identify by word description the variable selected for display;

means for comparing the code in said register with the phrase codes in the phrase section of said magnetic drum;

means for reading the coded value of a variable from the current data section of said magnetic drum when said comparing means detects a coincidence between a coded phrase and the code stored in said register; and numerical display means connected to said second reading means for presenting a numerical display of the value of the variable identified by said word display means.

3. Apparatus for display of a variable as set forth in claim 2 wherein said word selection means includes an array of pushbutton switches each labeled with one word stored in the dictionary section of said magnetic drum.

4. Apparatus for display of a variable, comprising:

word selection means for selecting the variable to be displayed;

means connected to said word selection means for generating a code representing the word description of the variable to be displayed;

an input register connected to said code generating means for temporary storage of said generated code;

a magnetic drum having a dictionary word section for storing in code form a dictionary of words available in said word selection means, a current data section for storing in code form the latest readings of the variables chosen for display and a phrase section for storing in code form the phrases selected to represent the variables chosen;

a read/write amplifier for reading the coded words from the dictionary section of said magnetic drum;

means connected to said read/write amplifier and said input register for selecting the word from the dictionary section as called for by the generated code;

word display means connected to said last name means and actuated by the word codes from said magnetic drum to identify by word description the variable selected for display;

a second read/write amplifier for reading the phrase codes in the phrase section of said magnetic drum;

a comparator connected to said second read/write amplifier and said input register for comparing the generated code with the phrase codes stored in said phrase section;

a third read/write amplifier for reading the coded value of a variable when said comparator detects coincidence between the generated code and a phrase code; and numerical display means connected to said third read/write amplifier for presenting a numerical display of the value of the variable identified in said word display means.

5. Apparatus for display of a variable, comprising:

word selection means for selecting the variable to be displayed;

means connected to said word selection means for generating a code representing the word description of the variable to be displayed;

an input register connected to said code generating means for temporary storage of said generated code;

a magnetic drum having a dictionary word section for storing in code form a dictionary of words available in said word selection means, a current data section for storing in code form the latest readings of the variables chosen for display and a phrase section for storing in code form the phrases selected to represent the variables chosen for display;

a read/write amplifier for reading the coded words from the dictionary section of said magnetic drum;

drive control means connected to said read/write amplifier and said input register for selecting the words from the dictionary section as called for by the generated code;

word display means connected to said last name means and actuated by the word codes from said magnetic drum to identify by word description the variable selected for display;

a second read-write amplifier for reading the phrase codes in the phrase section of said magnetic drum;

a comparator connected to said second read/write amplifier and said input register for comparing the generated code with the phrase codes stored in said phrase section;

an address counter connected to said second read/write amplifier for determining the address of the phrase that coincides with the generated code;

a third read/write amplifier for reading the coded value of a variable from the current data section of said magnetic drum;

a display control connected to said address counter, said third read/write amplifier and said comparator for controlling the reading of a code from the current data section of said magnetic drum; and numerical display means connected to said display control for presenting a numerical display of the value of the variable identified in said word display means.

6. Apparatus for display of a variable as set forth in claim 5 wherein said drive control means includes a digit compare means and a gate means for each word address stored in said input register.

7. Apparatus for display of a variable as set forth in claim 6 wherein said display control includes a gate means responsive to said address counter and said comparator, a memory for temporary storage of the address from said address counter, a digit compare means actuated by a master timer, and a second gate means connected to said digit compare means and said third read/write amplifier.

References Cited

UNITED STATES PATENTS 3,324,458 6/1967 MacArthur ------- 235—151.1

OTHER REFERENCES

"Industrial Computers for Tank Farm Inventory Control and Data Handling," E. B. Turner, Electrical Engineering, May 1960.

JOHN W. CALDWELL, *Primary Examiner.*

THOMAS B. HABECKER, *Examiner.*

A. J. KASPER, *Assistant Examiner.*